United States Patent [19] [11] 4,017,857
Evans, Jr. et al. [45] Apr. 12, 1977

[54] COMPUTER TIME CLOCK

[76] Inventors: Howard M. Evans, Jr., 6043 Bayou Grande Blvd., NE., St. Petersburg, Fla. 33703; Lawrence F. Trodd, 3621 19th St., North, St. Petersburg, Fla. 33713

[22] Filed: Mar. 3, 1975

[21] Appl. No.: 555,079

[52] U.S. Cl. .............................. 346/33 M; 346/82; 346/134; 360/2

[51] Int. Cl.² .................. G01B 9/00; G01D 15/34; G11B 25/04

[58] Field of Search .................. 346/33 M, 82, 134; 360/2

[56] References Cited

UNITED STATES PATENTS

| | | | |
|---|---|---|---|
| 3,171,649 | 3/1965 | Harwood et al. | 346/134 X |
| 3,501,622 | 3/1970 | Weir et al. | 346/134 UX |
| 3,530,448 | 9/1970 | Clancy et al. | 360/2 X |
| 3,614,394 | 10/1971 | Bindshedler | 346/33 M |
| 3,708,790 | 1/1973 | Nourigät | 346/134 UX |
| 3,737,884 | 6/1973 | Wallace | 360/2 |
| 3,740,759 | 6/1973 | McKeegan et al. | 346/82 X |

*Primary Examiner*—George H. Miller, Jr.
*Attorney, Agent, or Firm*—Duckworth, Hobby, Orman, Allen & Pettis

[57] ABSTRACT

A time accounting system including at least three distinct elements: a magnetic stripped card, a recording clock and a recorder/encoder assembly. The magnetic stripped card is fed into the recording clock which prints and electromagnetically encodes predetermined information such as the date and time upon the card. The card is then output from the recording clock. At the end of a given accounting period, the cards are gathered and stacked in the input portion of the recorder/encoder assembly. The recorder/encoder assembly accepts each card and transfers the information contained onto magnetic tape for direct input to a computer. As each used card is read, the recorder/encoder prints and encodes a new card.

8 Claims, 5 Drawing Figures

COMPUTER TIME CLOCK

BACKGROUND OF THE INVENTION

1. Field of the Invention

A time accounting system, utilizing a magnetic stripped card, primarily designed for use in a computerized accounting system.

2. Description of the Prior Art

Time clocks and time recording systems are well-known in the prior art and are presently commercially available in a number of varied design configurations for a number of general and specific applications. Typically, a number of these prior art time clocks print the time on a card. The time is printed at the beginning and at the end of a job or work period. At the end of an accounting period, the time cards are normally manually gathered and the various time periods are manually computed to determine a total time period for which pay is then allocated. In the case of a firm employing a large number of persons, the time cards to be processed at the end of each accounting period becomes burdensome. This results in an extremely costly and time consuming accounting procedure.

There have been several attempts in the industry to rectify the above-mentioned inherent problems present in many of the prior art systems. One such system resulting from the attempted modifications involved the use of a time clock which registered time onto the card through a series of punches. At the end of the accounting period, the card was processed through a computer. Systems utilizing this type of technique, while providing relatively rapid data reduction, frequently have serious problems in that the time punched on the card is not immediately readable by the employee through mere examination. The employee is therefore unable to check the accuracy of the time recorded on the card, and similarly, the employer is unable to immediately determine the time that the employee is on the job from a mere occular examination of the card. For the employer to obtain this frequently needed information, the card must be processed through a computer. Of course, this is costly as well as time consuming.

Other prior art systems designed to alleviate the above-mentioned problems inherent in known or commercially available systems involve the time being printed on a card. At the end of the accounting period the data is reduced from the card to the computer generally by optical scanning equipment. In practice, optical scanning equipment is extremely expensive and sophisticated. Thus, any repairs to the sophisticated scanning equipment are expensive. Systems of this type have not met with extreme commercial success primarily because of the expense of initial installation, maintenance and reliability.

Additional prior art systems attempting to simplify time accounting has been the use of a plastic card, much like a credit card. The plastic card is encoded by holes or like means representing employee name, number and/or other desired data. The data contained on the card may be reduced by a computer. However, there are inherent problems in that the employee and employer are not immediately able to visably observe the information encoded on the card. Further, if there are frequent employee turnovers, the plastic cards themselves become a substantial expense.

Accordingly, it is obvious there is a need for a relatively simple time accounting system which gives the employee and employer immediately readable printout and provides easy data reduction for input to computers. Such a system must be relatively inexpensive to purchase and install and maintenance must be minimal. Further, the information receiving material must be relatively inexpensive while the entire operative system is reliable.

SUMMARY OF THE INVENTION

The present invention is directed to an automatic accounting system which may comprise a plurality of inter-related devices which make up the operable components of the system. In the preferred embodiment, three of the components comprise a magnetic stripped card, a recording clock and a recorder/encoder assembly.

The magnetic stripped card is an information receiving means with a surface upon which information may be visably recorded and another surface or portion upon which information may be electromagnetically encoded.

The recording clock comprises structure which prints and encodes desired data or information upon the card or information receiving device. The card is operatively processed by the recording clock by inserting it into an aperture or the like in the recording clock. If the card is properly oriented wherein the magnetic strip is operatively positioned properly for a read head to read the magnetic strip, the card will be accepted into the recording clock. The clock contains motors or transporting means which pull the card into the clock. When the card reaches a predetermined location, the transporting means stops and the card ceases its travel. A printer prints out the desired information upon the card. The drive motors again start and the card is driven along its path within the recording clock. At this time, the write head electromagnetically encodes information upon the magnetic strip on the card. The card is then discharged from the recording clock. In the meantime, a second card is drawn into the time clock to be printed upon and then electromagnetically written upon in the same sequence as the preceding card. The recording clock continuously accept cards, but does so in such a manner that only one card is in the printing and encoding area of the clock at one time.

The recording clock has an internal clock mechanism which is electrically connected to a convertor. The convertor accepts the signals from the clock and converts the signals into a form for the write head to encode the magnetic strip on the card and an internal tape recorder. The convertor also activates the printer mechanism.

The recorder/encoder portion of the invention is used to process the cards from a prior accounting period and prepare new cards for a future accounting period. The cards from the prior accounting period are stacked in one card stack and unused cards are stacked in another card stack device. The recorder/encoder accepts each of the cards one at a time, in sequence, from the prior accunting period stack. Each card is individually driven under an electromagnetic read head in the recorder/encoder. The read head reads all the data encoded upon the magnetic strip, performs a parity check for accuracy and stores this in a memory device and upon magnetic tape for input to a computer. The card is then discharged from the machine.

The recorder/encoder further includes a typewriter means and printer unit for visably registering employee identification on new cards to be used for the next period. Similarly, the new card is then driven past a write head. The write head electromagnetically encodes upon the card the required employee identification information and any other pertinent data to prepare the card for the upcoming accounting period.

The typewriter means, printer unit and memory means may also be used when a card is to be encoded or registered thereon with information which is not read off a prior card. Such would be the case when a new employee was added to the payroll. The typewriter means is connected to the printer head and to the write head such that the card is printed upon and also electromagnetically encoded. The memory means automatically calls up the pay period information.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference character refer to similar parts throughout the several views of the drawings.

DETAILED DESCRIPTION

The time recording system of the present invention may comprise at least three interrelated and operable component parts; a card means, a recording clock means and a recorder/encoder means. At least one embodiment of the present invention comprises utilization of a magnetic stripped card wherein another embodiment utilizes a card without a magnetic strip thereon.

Figure 1:
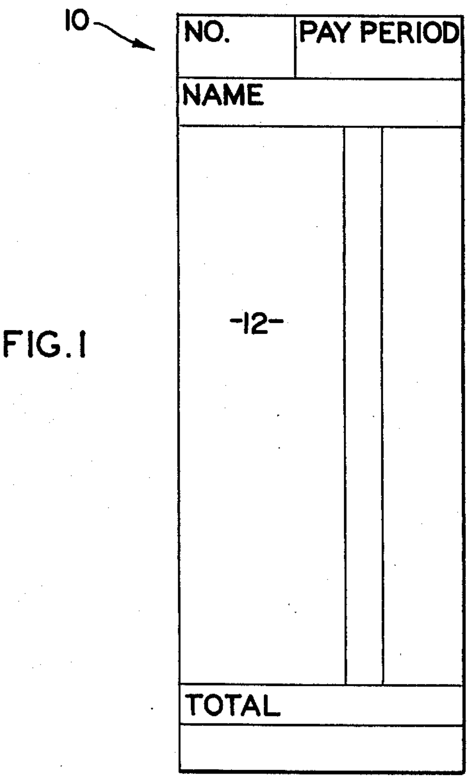
FIG. 1 is a front view of one embodiment of the card means of the present invention.

Card means 10 (FIGS. 1 and 2) comprises an information receivng area divided to receive two distinct types of information. The first part may define the front surface of the card and is a print receiving portion indicated as 12 (FIG. 1). In one embodiment, the card means further comprises a magnetized strip 14 disposed on the rear surface 15 of card means 10. Any suitable material may be used which is capable of accepting visible print. The information receiving portion 12 may further comprise a plurality of designated or segregated areas for specific information. Magnetic strip means 14 is capable of having preselected or desired information electromagnetically encoded thereon. While strip means 14 is represented as comprising an elongated configuration, it should be noted that it may include various configurations not necessarily limited to a strip or the like.

Figure 3:
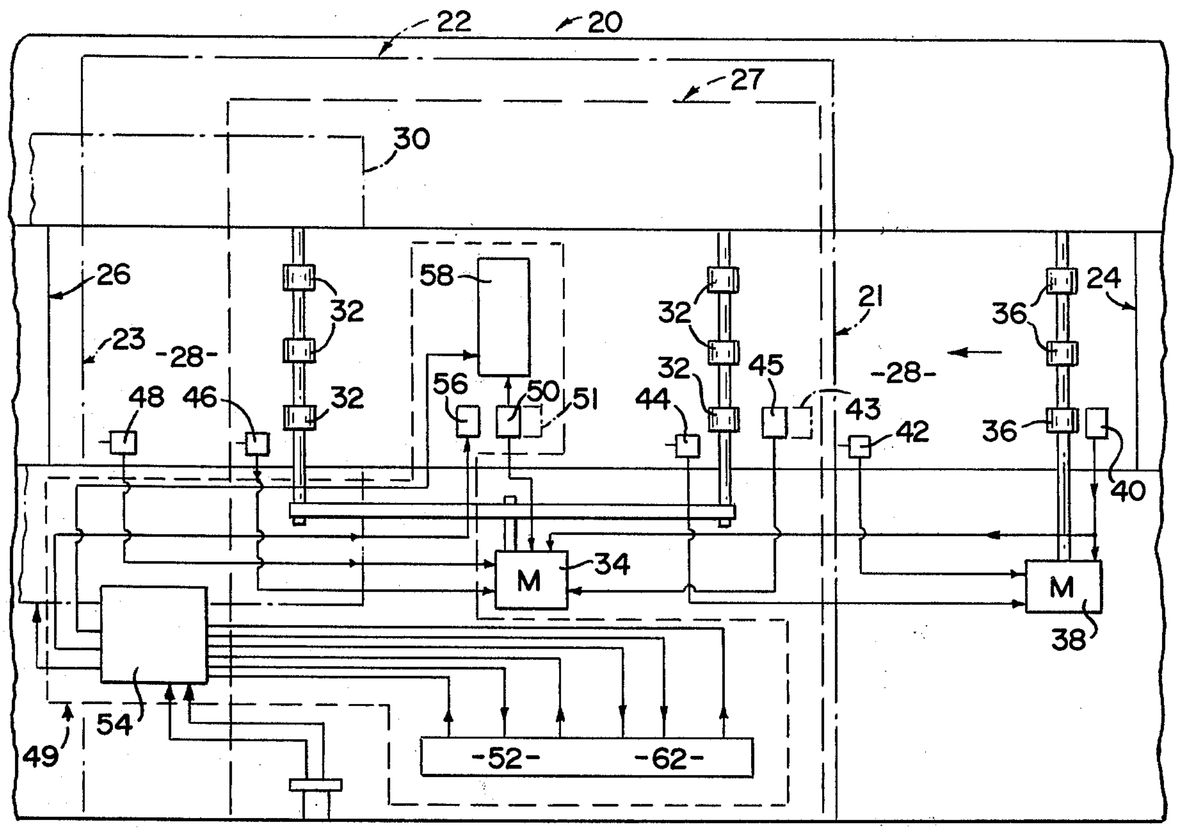
FIG. 3 is a schematic view of the recording clock means disclosing in broken lines a plurality of embodiments of the present invention.

A preferred embodiment of the time recording system further comprises recording clock means generally indicated as 20 in FIG. 3. The recording clock includes an inlet aperture 24 and an outlet aperture 26 disposed and configured to respectively accpet and allow exiting of the magnetic stripped card means 10 from the clock means 20. A card passageway 28 is disposed in interconnected, communicating relation between inlet aperture 24 and outlet aperture 26 and defines the path of travel of the card as it passes through the recording clock means 20.

A card transporting means designed to carry or transport the card through the recording clock means 20 and along the passageway means 28 is located in card engaging position in the card passageway 28. The transporting means comprises drive roller means 32 powered by drive motor means 34. A gate roller means 36 is disposed adjacent inlet aperture 24 and within card passageway 28. The gate roller means 36 are drivingly connected to gate motor means 38 and are driven thereby. The disposition of gate roller means 36 is such as to drive magnetic strip card means 10 from inlet aperture 24 to drive roller means 32.

Accept/reject card means 40 is positioned, in card interruptive relation, in or adjacent to card passageway 28 to detect the presence of the magnetic strip card means 10. The accept/reject card means 40 may comprise a read head which serves as a sensing element designed and disposed so as to send activating signals upon sensing the presence of a card means 10 entering passageway 28. The accept/reject card means 40 is electrically connected to both gate motor means 38 and drive motor means 34. As stated above, the presence of a card means 10 in sensing relation to the accept/reject card means 40 serves to activate either or both of the gate motor means 38 and the drive motor means 34, which will be explained in greater detail hereinafter. This serves to regulate the operation of the gate motor means 38 and drive roller means 32 and thereby regulate the passage of card means 10 into and along the passageway 28.

A card separation means 42 and a gate motor shutoff means 44 both comprises sensing elements which may be in the form of on/off switches, again of conventional design wherein their primary function is to sense the presence of a predetermined object such as the card means 10. The card separation means 42 and gate motor shut-off means 44 are operatively positioned within card passageway 28 as shown in FIG. 3. Both of these elements are in electrical connection with gate motor means 38 and as such serve to regulate the operation of gate roller means 36, dependent upon the presence or non-presence of a card means 10 relative to the sensing elements comprising the card separation means 42 and gate motor shut-off means 44 in passageway 28.

Figure 2:
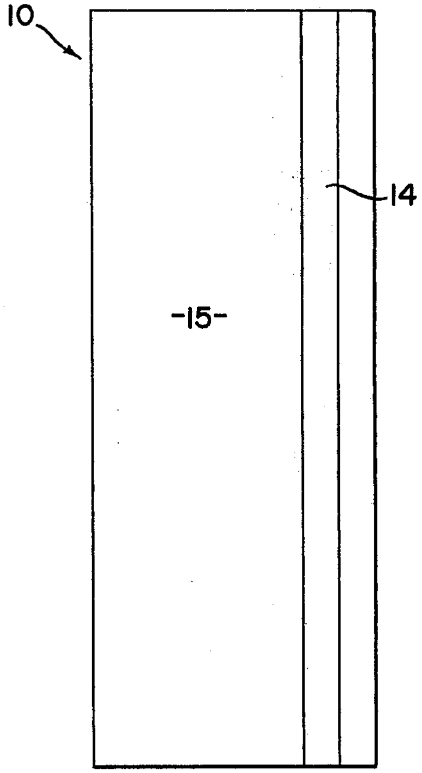
FIG. 2 is a rear view of the card means having a magnetic strip thereon.

In another embodiment of the present invention, the recording clock means, comprising an integral, operative component of the recording system, is generally indicated as 22 and is segregated in broken lines in FIG. 3 from the remaining embodiments of the present invention. More specifically, recording clock means 22 includes an inlet aperture 21 and an outlet aperture 23 also interconnected by passageway 28. It can be seen however that for purposes of explaining the embodiments of recording clock means 22, the configuation and/or disposition of passageway 28 is altered. It should be noted, however, that in actual use, the actual configuration of passageway 28 relative to the various embodiments of the present invention discussed is immaterial. As will be more evident hereinafter, the card means best shown in FIG. 1 and indicated as 10 does not require the provision of a magnetic strip 14 on the rear surface thereof as shown in FIG. 2.

The main structural modification between embodiments of the recording clock means 20 and the recording clock means 22 is the deletion from the transportation means of the gate roller means 36 and the related structural and electrical components used to activate the gate roller means 36. More specifically, the recording clock means 22 does not include accept/reject card means 40, gate motor means 38, gate rollers 36, card separation means 42 and gate motor shut-off means 44. The drive motor start means 45, which may include a read head is still maintained in electrical connection with drive motor means 34 and as such, essentially serves the same function as accept/reject card means 40 in the embodiment of recording clock means 20. As can be seen from FIG. 3, the transportation means of recording clock means 22 still comprises drive motor means 34 mechanically and drivingly connected to drive roller means 32 which are positioned in card engaging relation in the passageway 28.

The time recording system of the present invention further comprises electromagnetic encoder means generally indicated as 49 including a clock means 52 electrically connected to convertor means 54. This convertor means 54 is disposed in electrical communication with printer means 58, electromagnetic write means 56 and optional internal recorder means 30. Clock means 52 is also in communication with display means 62 which visibly displays the time and possibly other desired information. The clock means 52 may comprise any method of generating a time signal by visual display. Convertor means 54 receives clock signals from clock means 52 and converts the signals to the necessary electronic impulses that are passed to the printer means 58. More specifically, these signals from convertor means 54 are passed to the write means 56 and optional internal recorder means 30. The specific operative relation of the components set forth above will be described in detail hereinafter with specific reference to the operation of the various embodiments of the present invention.

With specific reference to FIG. 3 and the embodiment of the recording clock means of the present invention indicated as 20, a magnetic strip card means 10 is inserted in inlet aperture 24. Upon the detection of the magnetic strip means 14 by accept/reject card means 40, gate motor means 38 and drive motor means 34 are energized causing gate roller means 36 and drive roller means 32 to rotate. If no magnetic strip means 14 is detected on card means 10 by the accept/reject card means 40, the gate rollers 36 are not activated and the card means without the magnetic strip 14 will not be able to enter the recording clock means 20.

Upon activation of the gate roller means 36 and drive roller means 32, a card means 10 is pulled into the recording clock through inlet aperture 24 and along passageway 28 by gate roller means 36. The card travels under direction and force by gate roller means 36 along passage means 28 and into the drive roller means 32. Upon the card means 10 reaching gate motor shut-off means 44, disposed in the passageway 28, gate motor means 38 will be de-activated leaving drive motor means 34 in its "on" state so as to continue to propel the card means 10 into the read/write area as will be described in detail hereinafter. Upon the card means 10 engaging gate motor shut-off means 44, the deactivation of gate motor means 38 and accordingly gate roller means 36 will prevent inadvertent positioning of an additional or second card means into the recording clock means 20 until the gate roller means 36 are again activated.

Read means 50 is disposed along passageway 28 and on the interior of the recording clock means 20 at a predetermined point such that it will not detect the first electromagnetically printed signal on the magnetic strip means 14 until the card means 10 is located completely inside the gate roller means 36. This eliminates any outside interference to the card means 10 while it is being sensed by read means 50. Drive roller means 32 drives card means 10 past print read means 50. This read means 50 detects the presence of encoded data on the magnetic strip means 14 and when the proper code is found, drive motor means 34 and drive roller means 32 are de-activated thereby stopping the card means 10 at a predetermined position relative to the print/read means 50. The print/read means 50, upon reading the proper code causes printer means 58 to print the time and day, and any other desired information, as signalled from convertor means 54. Print read means 50 then causes drive motor means 34 to again activate driver roller means 32 thereby causing movement of the card. Card means 10 begins moving under electomagnetic write means 56. Convertor means 54 causes electromagnetic write means 56 to write the time, day and next print position on magnetic means 14. Converter means 54 also signals internal recorder means 30, the employees number and the time and day for storage.

Card separation means 42 is now activated and serves to energize gate motor means 38 causing gate roller means 36 to rotate pulling in the next magnetic card means 10 to be processed, if one is waiting in the inlet aperture 24. If there is no magnetic card means 10 waiting in inlet aperture 24 to enter the recording clock means 20, the gate motor shut-off means 44 is activated to shut-off the gate motor means 38 which, in turn, prevents rotation of the gate roller means 36.

The magnetic strip card means 10 is driven out of the recording clock means 20, along passage 28 and through outlet aperture 26 through the activation of the drive roller means 32. When the drive motor shut-off means 48 senses that the card means 10 is no longer in the recording clock means 20, the drive motor means 34 is de-energized and the drive roller means 32 ceases rotation or driving operation until it is again activated by the next incoming card means 10.

It is to be emphasized that the above procedure takes place when approximately the first half or "leading" portion of the print receptor surface 12 of the magnetic strip card means 10 is printed by printer means 58. Since printing by printer means 58 must occur while the card means 10 is stopped, the lower portion or the remainder of the card means 10 is still positioned, while the upper half is being printed, in direction interruptive relation relative to the gate roller means 36. Accordingly, any entrance of a second card past the gate roller means 36 would cause a fouling or interruptive flow between succeeding cards passing through the time recorder means 20. In order to prevent this, the gate motor means 38 and the gate roller means 36 are prevented from being activated until the card separation means 42 senses that the end or trailing edge of the card being printed upon passes beyond the card separation means 42. As stated above, upon such passage of the card means 10 beyond the card separation means 42, the card separation means 42 is activated and in turn energizes gate motor means 38 causing gate roller means 36 to rotate, pulling in the next magnetic card 10 if one is waiting at the inlet aperture 24.

If printing is to occur on approximately the second half of the surface 12 of the card means 10, the card separation means 42 will be activated by trailing edge of the card means 10 as it passes therebeyond. The second half of the surface 12 is positioned adjacent the print/read means 50 and write means 56. Concurrently proper spacing is thereby provided between the magnetic strip card means 10 which has already entered passageway 28, and the next magnetic strip card means 10 which has just been pulled into the recording clock means 20 by the gate roller means 36.

As explained above, when the second half of the card means 10 is to be printed upon, the magnetic strip card means 10 that is still in the card passageway 28 and being driven along by roller means 32 now moves into the print/read position. Print/read means 50 detects the presence of encoded data on the magnetic strip means 14 and when the proper code is found, causes drive motor means 34 to deenergize drive roller means 32 and magnetic stripped card means 10 stops. The print/-read means 50 upon reading the proper code causes printer means 58 to print the time and day as signalled from the convertor means 54. Print/read means 50 then causes drive motor means 34 to energize drive roller means 32. Magnetic stripped card means 10 begins moving under electromagnetic write means 56. Convertor means 54 causes electromagnetic write means 56 to write the time, day and next print position on magnetic strip means 14. Convertor means 54 also signals internal recorder means 30, the employees number and the time and day.

The magnetic strip card means 10 is driven out of recording clock means 20 through outlet aperture 26 by the drive roller means 32. When drive motor shut-off means 48 senses that the magnetic card means 10 is no longer in recording clock 20, the drive motor means 30 and the drive roller means 32 are de-activated.

The operation of the recording clock means embodiment designated in FIG. 3 as 22 will be described in detail hereinafter. Again, it is important to note that, as set forth above, various components are deleted from this embodiment that are present in the embodiment of recording clock means 20. Specifically, recording clock means 22 does not include accept/reject card means 40, gate motor means 38, gate roller means 36, card separation means 42 and gate motor shut-off means 44. Drive motor start means 45 serves as an accept/reject card means and is positioned as indicated in FIG. 3 (embodiment 22) and takes the place of the accept/reject card means 40 present in the structure of the embodiment of the recording clock means 20 as set forth above. As such drive motor start means may be termed a second accept/reject card means, and is electrically connected to the drive motor means 34. Means 45 in no way serves to activate or de-activate the gate motor means 38 which is deleted from this embodiment.

Specifically, a magnetic strip card means 10 is inserted in inlet aperture 24. If second accept/reject card means 45 does not detect the presence of a magnetic strip 14 on the card means 10, drive motor means 34 will not be activated and the entrance of card means 10 into the recording time clock means 22 cannot occur. If the magnetic strip means 14 is sensed by the accept-/reject card means 45, drive motor means 34 is energized causing drive roller means 32 to rotate. The card means 10 is thereby pulled into the recording clock means 22 and properly positioned relative to the read head 50 and write head 56.

Drive roller means 32 drives card means 10 past print means 58. A sum of the digits check may be included in more than one embodiment of the recording clock means of the present invention. In operation, the print means is inter-connected to the transporting means which can serve as a reject means if the sum of digits check does not correspond. The motor means can be activated and the transporting means serves to pass the card means through the normal operation of the transporting means. Read head 50 detects the presence of encoded data on magnetic strip 14 and when the proper code is found, causes drive motor means 34 to de-energize drive roller means 32 thereby stopping card means 10 in a predetermined position relative to the print read heads 50 and printer means 58. Print read means 50, upon reading the proper code, causes printer means 58 to print the time and day as signalled from the convertor means 54. Print/read means 50 then causes drive motor means 34 to energize drive roller means 32. Magnetic stripped card means 10 begins moving under electromagnetic write head 56. Convertor means 54 causes electromagnetic write means 56 to write the time, day and next print position on magnetic strip means 14. Convertor means 54 also signals internal recorder means 30, the employee's number and the time and day for internal memory storage. Magnetic card strip card means 10 is driven out of recording clock means 22 through outlet aperture 26 by the drive roller means 32. When drive motor shut-off means 48 senses that magnetic card means 10 is no longer in recording clock means 22, the drive motor means 34 is de-energized and the drive roller means 32 ceases rotation or driving operation.

It should be noted relative to the operation of the embodiments of recording clock means 20 and recording clock means 22 that the same magnetic strip card means 10 can be utilized repeatedly to record the periodic increment in a given time period until the magnetic strip means 14 is filled with the encoded information or data. Alternately, the same card is used until the pay period or given time period comes to an end.

Yet another embodiment of the present invention comprises the recording clock means 27. This embodiment designated as the recorder clock means 27 differs from the embodiments of recorder clock means 20 and 22 by virtue of the fact that the recording clock means 27 does not include an accept/reject card means 40, gate motor means 38, gate roller means 36, card separation means 42, second accept/reject card means 45, drive roller means 42 gate motor shut-off means 44, read head means 50, write head means 56 and drive motor shut-off means 48. In addition, the internal tape recorder means 30 is also omitted. More specifically, as will be evident with regard to the detailed discussion of the operation of this embodiment hereinafter provided, the second accept/reject card means 45 is replaced with a drive motor start means 43 and read head means 50 is replaced with a die cut switch means 51.

In operation, a card means 10 which does not require the presence of magnetic strip means 14 as shown in FIG. 2, is inserted into an inlet aperture 21. The drive motor start means 43 signals drive motor means 34 to start, causing drive roller means 32 to rotate. Card means 10 is now pulled into recording clock means 27 by operation of the drive roller means 32. The card means 10 is driven down card passageway means 28 until the contact is made with the die cut switch means 51. This signals drive motor means 34 to stop, thereby ceasing rotation of the drive roller means 32 in turn serving to stop the motion of card means 10 along passageway 28. Printer means 58 will print and die cut switch means 51 will sever, clip or otherwise remove a corner of the card means 10 thereby telling the printer means 58 where to print on the next pass through the recording clock means 27. Drive motor means 34 restarts the moving card means 10 so as to allow it to travel along passageway 28 by virtue of its driving engagement with its drive roller means 32. The card means 10 is driven out of recording clock means 27 through outlet aperture 23. When the drive motor shut-off means 46 senses that card means 10 is no longer in the recording clock means 27 along passageway 28, drive motor means 34 is de-energized and drive motor means 32 ceases rotation of driving operation.

Similar to the card means utilized with the embodiments of recorder clock means 20 and 22, as set forth above, the card means 10 may be inserted into the recording clock means 27 a repeated number of times until the card means 10 or more specifically the surface 12 is filled with information or the pay period comes to an end.

Figure 4:
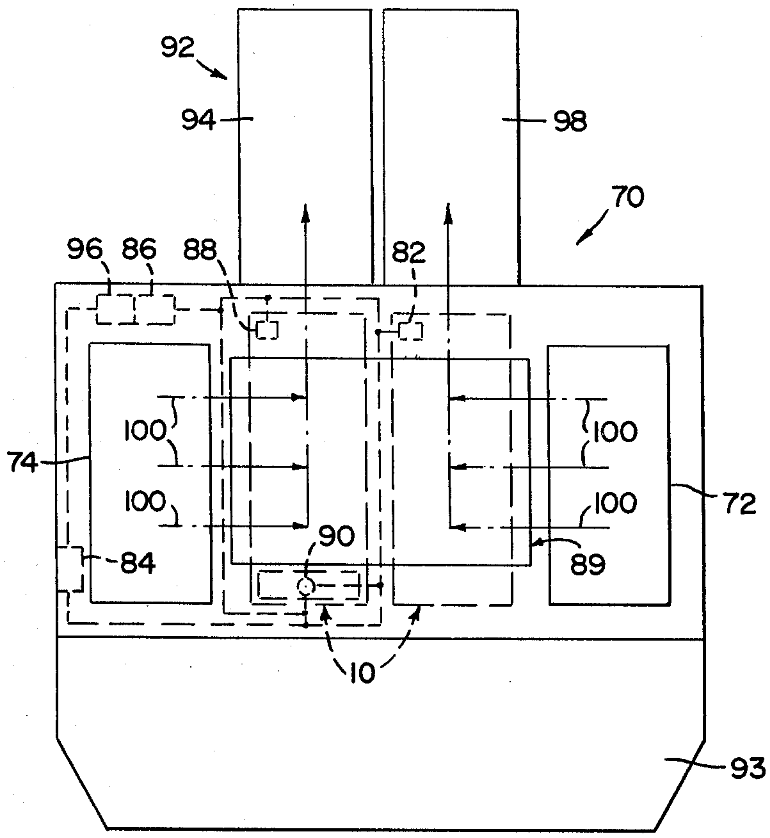
FIG. 4 is a top view in partial schematic of the recorder/encoder means.
Figure 5:
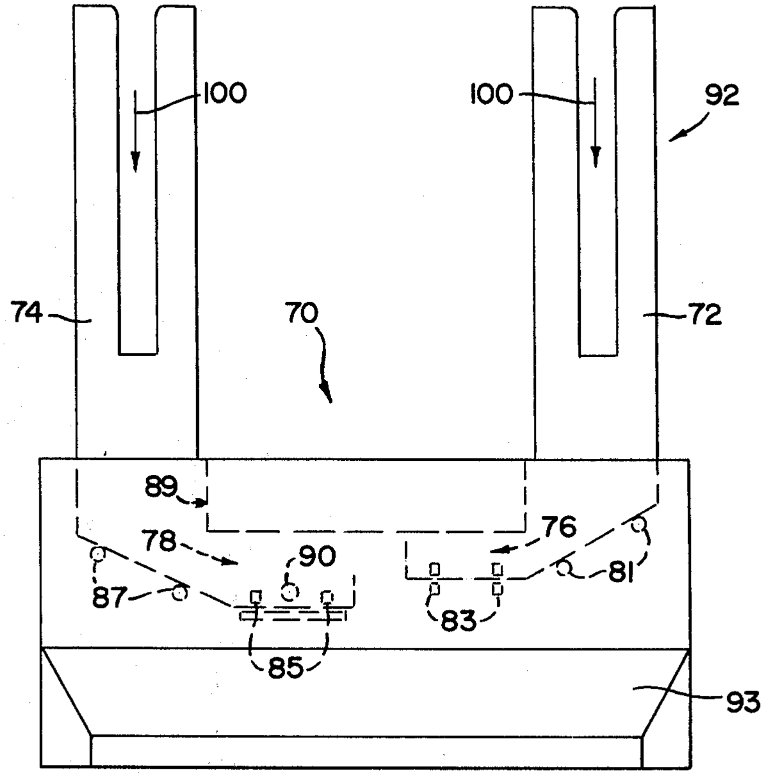
FIG. 5 is a front view of the recorder/encoder means of FIG. 4.

As clearly disclosed in FIGS. 4 and 5, the time recording system further comprises a recorder/encoder means generally indicated as 70. Recorder/encoder means 70 comprises encoded card stack means 72 and blank card stack means 74. Card feed means 81 and card feed means 83 are cooperatively located within recorder/encoder means 70 to transport magnetic stripped card means 10 through recorder/encoder means 70 and into catch basket means 92 as shown by flow chart means 100.

Card feed means 87 and card feed means 85 are cooperatively located within recorder/encoder means 70 to transport magnetic stripped card means 10 through recorder/encoder means 70 and into catch basket means 94 as shown by directional arrows (FIG. 4).

Read means 82 is located in predetermined position within card passageway means 76 and is in electrical communication with convertor means 86. Convertor means 86 is then in communication with memory means 96, with internal recorder means 89, with external recorder means 84, with encoder means 88 and printer means 90.

In the preferred embodiment shown in FIGS. 4 and 5, it is further contemplated that there are two card stack means, one for magnetic stripped card means 10 which have been recorded upon by recording clock means 20 or recording clock means 22 and the other for magnetic stripped card means 10 which are being prepared for future use in recording clock means 20 or recording clock means 22.

Recorder/encoder means 70 further comprises printer means 90 driven electrically by memory means 96. Also connected to printer means 90 is typewriter console means 93. Printer means 90 is cooperatively positioned in a predetermined location within card passageway means 78.

In operation, upon the magnetic stripped card means 10 being completely encoded with information or when the information is desired to be reduced for accounting, the magnetic stripped card means 10 are stacked in card stack means 72 of recorder/encoder means 70. Blank, magnetic stripped card means 10 are stacked in blank card stack means 74.

Card feed roller means 81 drives one magnetic stripped card means 10 at a time to card passageway means 76. Card feed roller means 83 drives magnetic stripped card means 10 down passageway means 76 as shown by directional arrows 100. Magnetic strip means 14 on magnetic stripped card means 10 passes over read means 82 and the information is fed to memory means 96 for a sum of the digits check for accuracy. If rejected, magnetic stripped card means 10 is passed to reject catch basket 98 located under catch basket 92. Employee's name, number and clocking in and out times are passed from memory means 96 to the internal tape cassette means 89 and the external recorder jack means 84.

A blank magnetic card means 10 is driven to card passageway 78 and underneath printer means 90 by card feed roller means 87. Memory means 96 instructs printer means 90 to visually print employee's number and pay period information at the top of card means 10. Magnetic stripped card means 10 is driven down card passageway means 78 by card feed roller means 85, and underneath write head means 88.

As magnetic stripped card means 10 passes under write head means 88 on its way to catch basket means 94, the employee's name number and a print command is called up from memory means 96 and encoded onto magnetic strip means 14 of magnetic stripped card means 10. Magnetic stripped card means 10 is then passed into catch basket means 94. Encoder card means 10 is now ready for use in recording clock means 20 or recording clock means 22.

If new magnetic stripped card means 10 are to be prepared, these are stacked in card stack means 74 of recorder/encoder means 70. The card means is driven by card drive means 87 into card passageway means 78. When said card means 10 is properly positioned, printer means 90 prints identifying information on said card means. This information will be a portion of the information stored in memory means 96 and newly entered information via typewriter means 92. Said magnetic stripped card means 10 is then released and magnetic strip means 14 on said card means 10 passes under encoder means 88 which electromagnetically writes on said magnetic strip means 14. Now encoded card means 10 is expelled from card passageway means 78 into card catch means 94. These encoded card means 10 are now ready for use in recording clock means 20 or recording clock means 22.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A time recording system primarily designed for use in a computerized time accounting system, said time recording system comprising: information card means configured and dimensioned to include predetermined segregated portions, said information card means comprising a magnetic portion thereon, recording clock means including an inlet aperture and an outlet aperture disposed in aligned relation to one another, card passageway means disposed at least in part on the interior of said recording clock means and in interconnected relation between said inlet and outlet apertures, card transporting means comprising drive roller means disposed in said passageway means in driving engagement with said information card means passing therealong; electromagnetic encoder means including clock means and converter means electrically connected to one another such that information signals are sent to said converter means from said clock means, said electromagnetic encoder means further comprising electromagnetic write means electrically connected to said converter means and in predetermined location adjacent to said card passageway means and in operative relation to said magnetic portion of said information card means, whereby information is encoded thereon, said electromagnetic encoder means further comprising printer means electrically connected to said converter means to receive actuating signals therefrom, whereby information is printed on said information card means; recorder/encoder means comprising electromagnetic read means disposed in predetermined location adjacent to said information card means for reading time information on said magnetic portion, said recorder/encoder means further comprising memory means disposed in electrical communication with said electromagnetic read means, whereby said time information from said information card means is stored; said read means disposed in electromagnetic communication with a predetermined portion of said recorder/encoder means, said memory means disposed in electrical communication with said electromagnetic read means, said electromagnetic encoder means is in electromagnetic communication with a predetermined portion of said recorder/encoder means and in direct electrical communication with said memory means.

2. A time recording system as in claim 1 further comprising drive motor means in driving relation to said drive roller means; gate roller means in card driving relation to said inlet aperture means; gate motor means in driving relation to said gate roller means; first accept/reject card means in electrical connection with said gate motor means and said drive motor means and disposed in path interruptive relation to an incoming information card means relative to said inlet aperture means; and card separation means in electrical connection with said gate motor means and located in at least one predetermined position in said card passageway means.

3. A time recording system as in claim 1 wherein said clock means comprises clock motor means; display means connected to said motor means and electrically connected to said convertor means whereby as the motor operates, appropriate information is displayed and input to said convertor.

4. A time recording system as in claim 1 wherein said recorder/encoder means includes card stack means, card feed means in card communicating relation to said card stack means, and card catch means in card receptive communication to said card feed means.

5. A time recording system as in claim 4 further comprising memory means and recorder/encoder print means in electrical connection with one another, whereby said recorder/encoder print means may receive information pulses from said memory means and print it on said information card means.

6. A time recording system as in claim 4 further comprising a second card passageway means, card drive means in single card driving relationship in said second card passageway means, and a read means located in said recording clock means, in a predetermined position within said first card passageway means.

7. A time recording system as in claim 6 further comprising second card passageway means, card drive means in single card driving relation in said card passageway means and said encoder means located in a predetermined position within said card passageway means.

8. A time recording system as in claim 7 wherein said encoder means further comprises typewriter means in electrically driven connection with said memory means and said printer means.

* * * * *